138-169

L. F. BETTS.

SHEET METAL PIPE.

No. 10,339. Reissued June 12, 1883.

Witnesses—
Charles R. Searle,
F. W. Hanaford.

Inventor—
Lewis F. Betts,
By A. M. Pierce,
Atty.

N. PETERS, Photo-Lithographer, Washington, D. C.

UNITED STATES PATENT OFFICE.

LEWIS F. BETTS, OF NEW YORK, N. Y.

SHEET-METAL PIPE.

SPECIFICATION forming part of Reissued Letters Patent No. 10,339, dated June 12, 1883.

Original No. 256,955, dated April 25, 1882. Application for reissue filed December 20, 1882.

256955

*To all whom it may concern:*

Be it known that I, LEWIS F. BETTS, of New York, in the county of New York and State of New York, have invented certain new and useful Improvements in Sheet-Metal Pipes, of which the following is a full, clear, and exact description, reference being had to the accompanying drawings and the letters marked thereon.

My invention consists, essentially, in so constructing and forming sheet-metal pipe that it may be placed joint within joint for the purpose of shipment, storage, &c., and when required for use each section or length may be clasped together at its transversal edges, and the joints connected in the usual manner; and my invention involves certain novel and useful combinations of parts and peculiarities of construction, all of which will be hereinafter first fully described, and then pointed out in the claims.

Figure 1:
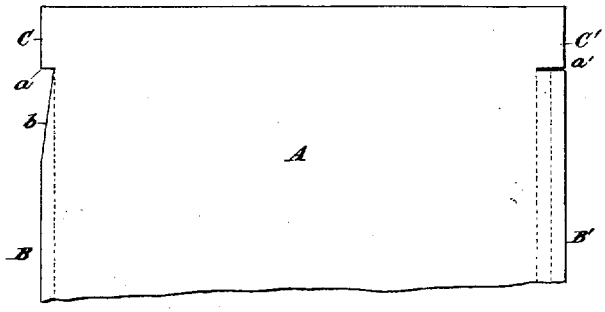
Figure 2:
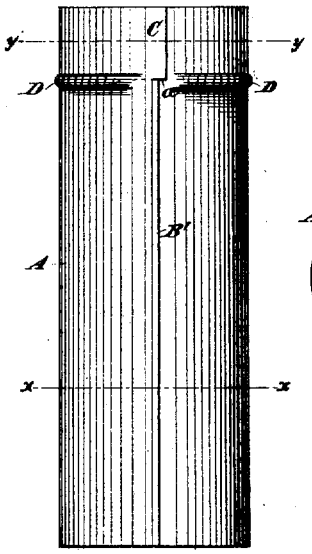
Figure 3:
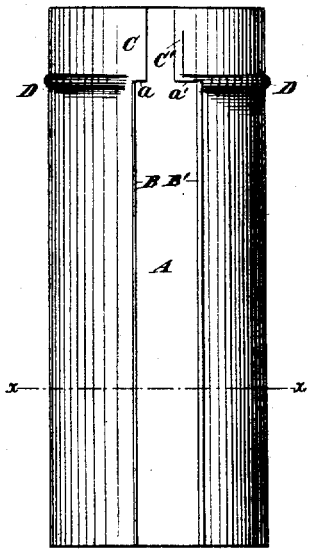
Figure 6:
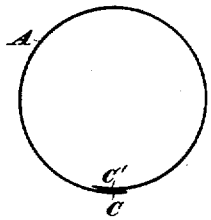
Figure 4:
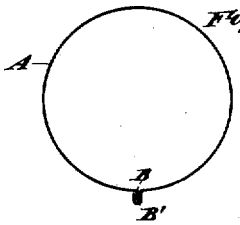
Figure 5:
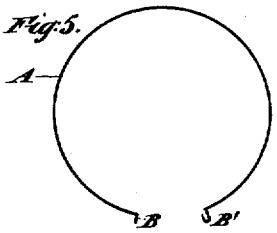
Figure 7:
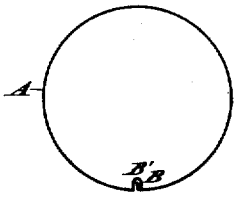

In the drawings, Figure 1 is a plan of a portion of the pipe-blank, showing the manner in which it is notched and cut, the folds being indicated by the dotted lines. Fig. 2 is an elevation of one section of pipe, the edges being clasped together; and Fig. 3 is a like elevation, showing the edges unclasped and sprung apart. Fig. 4 is a sectional view of the pipe shown in Fig. 2 at line *x x*, and Fig. 5 is a like view of the pipe shown in Fig. 3. Fig. 6 represents a section of the pipe shown in Fig. 2 at line *y y*. Fig. 7 is a sectional view, showing the clasped edges of the pipe turned inward instead of outward.

Like letters of reference, wherever they occur, indicate corresponding parts in all the figures.

Heretofore sheet-metal pipe made up ready for use has been an expensive article to ship, on account of the great bulk occupied by the same in proportion to its weight. Attempts have been made to produce an article already formed, but not fastened together at its edges, so that it might be packed in a small space; but when so formed it was not a complete article, and when put up for use required the services of a tinsmith and the use of rivets, &c., or the seam required to be hammered down upon a mandrel.

I am aware that stove pipes have been produced having the transveral edges of the blank bent to interlock, forming a seam when put together and flattened down; but when so constructed a strip or piece of flat material must be held within the pipe beneath the seam, and care is necessary in flattening the seam. When once joined together as explained this pipe cannot be disengaged at its transversal edges and again nested or placed joint within joint, but becomes ordinary stove-pipe. This is not the case with my improved pipe, and the use of tools or devices of any character in completing the seam is entirely avoided.

To overcome the numerous objections to the above-mentioned article I have devised a pipe which may be packed joint within joint, occupying but little more space than the sheets of metal, said pipe having that portion of the edges which are exposed when placed in position for use bent in such a manner as to interlock, and the smooth portion entering the joint next above made flat, as hereinafter explained.

My improved pipe may be produced at the cost of ordinary pipe, while at the same time it embodies the advantages above enumerated, and it may be taken from the package and joined together for use by any person without the use of tools.

A is the body of the pipe, formed of sheet metal in the usual manner. At *a a'*, a short distance from the end, notches are cut, that at *a'* being twice the depth of that at *a*. Below notch *a* the edge of the metal is turned outward at right angles to the pipe, forming a tongue, B, projecting radially to the body of the pipe. The metal upon the opposite edge is turned outward and back again, forming a hook or catch, B', projecting radially to the body of the pipe. Tongue B is cut away or beveled at *b*, in order to facilitate adjustment of the parts.

C C' are the straight edges of the pipe left above the clasped edges.

D is the usual swage or bead formed in the pipe, upon which the upper joint rests when placed in position thereabove.

If desired, the tongue B and hook B' may be turned inward, as shown in Fig. 7, the result being the formation of a pipe having a smooth joint upon its exterior.

In clasping a joint of pipe together at its transversal edges tongue B is pressed inward, the wide projection C″ is passed beneath C, and hook B′ is placed over the tongue. The spring of the metal will force the tongue into the hook, holding the edges firmly united. When the second and succeeding joints are placed upon the first they serve to firmly secure the parts together. In practice a hole might be punched through the tongue and hook, and a piece of wire, ring, rivet, or other device placed therein to hold the parts together; but this will be found to be unnecessary.

It will thus be seen that my improved sheet-metal pipe fills all the requirements of a cheap, simple, and durable article of the class to which it belongs.

Having now fully described my invention, what I claim as new therein, and desire to secure by Letters Patent, is—

1. In a self-clasping sheet-metal pipe-joint constructed of a single piece of metal, a radial tongue formed by bending one of the transversal edges of the metal at right angles to the body thereof, in combination with a radial hook formed upon the other transversal edge by bending the metal at right angles to the body thereof and then back upon itself, substantially as and for the uses and purposes shown and described.

2. A self-clasping sheet-metal pipe-joint formed of a single piece of metal having a tongue formed by bending one of the transversal edges of the metal in a radial direction to the body of the pipe, and a radial hook formed by the other transversal edge thereof, in combination with the portions C C″ upon one extremity of the pipe, overlapping in a contrary direction to said tongue and hook, substantially as shown and described.

3. In a self-clasping sheet-metal pipe of the character herein specified, the combination, with the flat portions of the transversal edges C C″, overlapping each other, of the tongue formed by bending one of the transversal edges below said portions C C″ in a radial direction to the body of the pipe, the other corresponding edge being bent outward and inward, forming a hook projecting radially to the body of the pipe, substantially as and for the uses and purposes shown and described.

4. In a self-clasping sheet-metal pipe of the character herein specified, the combination, with the overlapping portions C C″ of the transversal edges of the metal, of a radial hook formed by bending the remaining portion of one of the transversal edges of the body of the pipe inwardly, and the radial tongue formed by bending the remaining portion of the other transversal edge of the metal outwardly from the body of the pipe, said radial tongue being cut away for a short distance below the overlapping portion C, substantially as and for the uses and purposes shown and described.

5. A self-clasping sheet-metal pipe-joint of the character herein specified, formed of a single piece of metal, A, having a radial hook, B′, formed upon a part of one of the transversal edges, a radial tongue, B, upon a part of the other transversal edge, said tongue being cut away or beveled at *b*, and the overlapping portions of the transversal edges C C″, the whole combined and arranged to operate substantially as shown and described.

In testimony that I claim the foregoing I have hereunto set my hand in the presence of two witnesses.

LEWIS F. BETTS.

Witnesses:
F. W. HANAFORD.
A. M. PIERCE.